United States Patent
Lamb

[15] 3,651,694
[45] Mar. 28, 1972

[54] DIAGNOSTIC MEANS FOR DETECTION OF DISEASES EXHIBITING SKIN TEMPERATURE VARIATIONS

[72] Inventor: Anthony H. Lamb, 66 King Street, Hillside, N.J. 07205

[22] Filed: Sept. 18, 1969

[21] Appl. No.: 859,126

[52] U.S. Cl.....................73/342, 73/343.5, 73/362 AR, 128/2 H
[51] Int. Cl..........................G01k 3/08, A61b 5/00
[58] Field of Search..................128/2 H, 2.1 R; 73/340, 341, 73/342, 343.5

[56] References Cited

UNITED STATES PATENTS

| | | | |
|---|---|---|---|
| 2,971,379 | 2/1961 | Weisheit | 73/362 |
| 1,752,117 | 3/1930 | Smith | 128/2 R X |
| 2,888,918 | 6/1959 | Pierce et al. | 128/2 R |
| 3,530,718 | 9/1970 | Ehlo | 73/362 |
| 3,339,542 | 9/1967 | Howell | 128/2 R |
| 3,377,862 | 4/1968 | Gheorghiu | 73/362 |
| 3,402,378 | 9/1968 | Catlin et al. | 338/28 |
| 1,648,899 | 11/1927 | Hayman | 128/2 R |
| 2,909,926 | 10/1959 | Lingard | 73/362 |

OTHER PUBLICATIONS

Howell Instruments, Inc. Catalogue, Rec' d June 3, 1966, 6 pages

Primary Examiner—Richard A. Gaudet
Assistant Examiner—Kyle L. Howell
Attorney—Rudolph J. Jurick

[57] ABSTRACT

Temperature-sensitive probes, placed in contact with selected areas of the human body, actuate a digital temperature computer-indicator for the measurement of the base and differential temperatures of the contacted areas.

8 Claims, 7 Drawing Figures

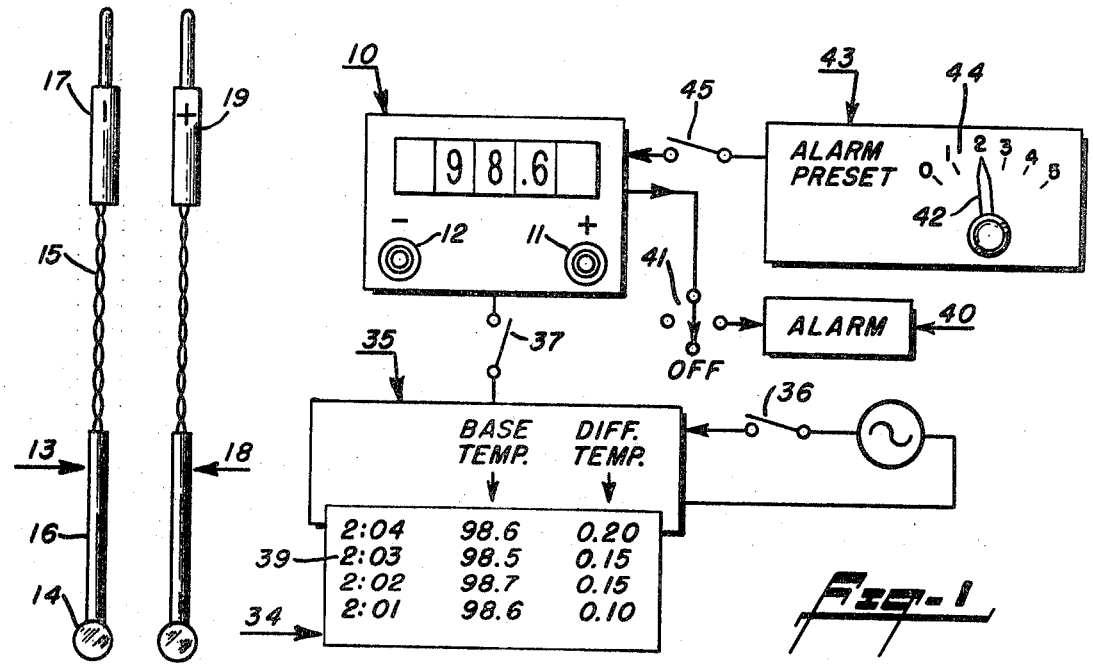
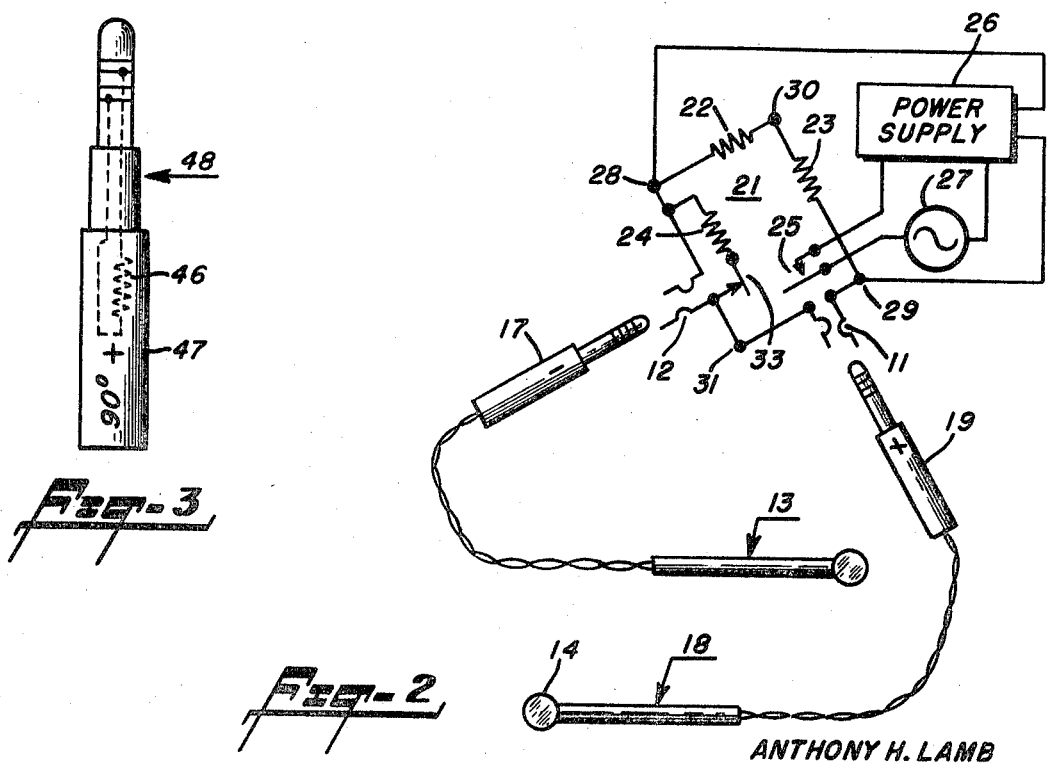

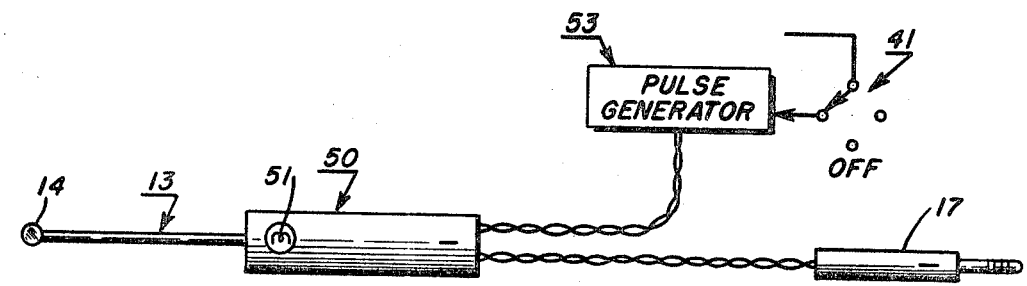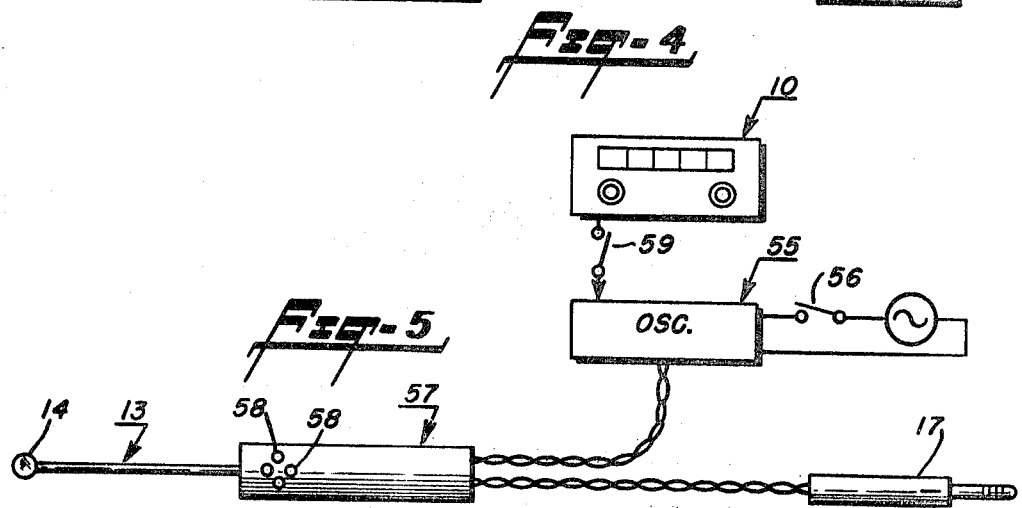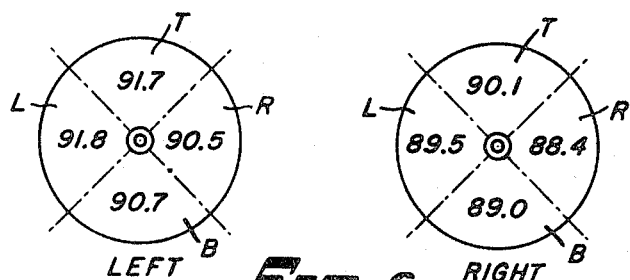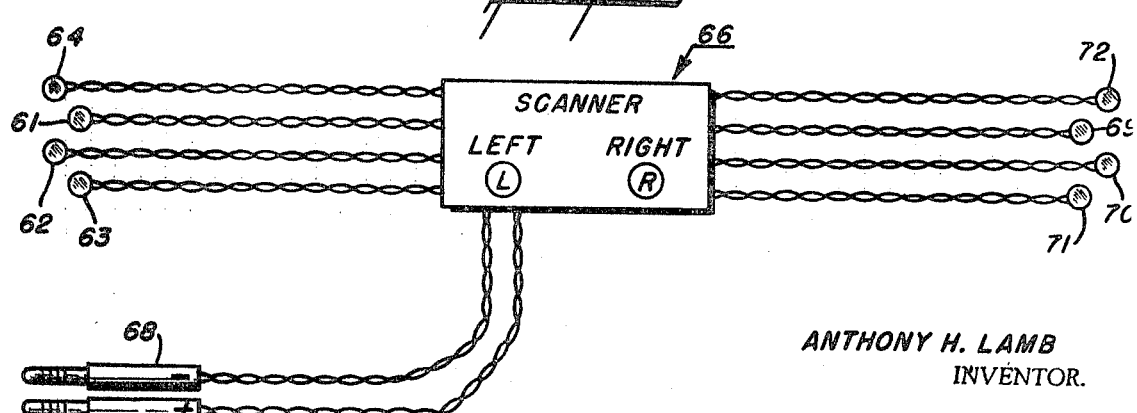

3,651,694

DIAGNOSTIC MEANS FOR DETECTION OF DISEASES EXHIBITING SKIN TEMPERATURE VARIATIONS

BACKGROUND OF THE INVENTION

It is known that a difference in skin temperature between corresponding, opposite zones of the human body may be taken as indicative of disease located in the zone having a higher or lower than normal temperature. Generally, the skin temperature at the affected area will vary from 1° to 10° F. above or below normal temperature, depending upon the area of the body being investigated and the severity of the disease. Thermographic means and methods are known for locating elevated temperature areas on the body. In one such arrangement, infrared radiation from the body is detected by a scanning method, and converted to a photograph. In another such arrangement, the body is coated with a phosphor which is excited to luminescence with ultraviolet radiation and a thermal pattern is displayed on a television tube. In these arrangements, the equipment is bulky, expensive and is effectively used only by highly trained personnel. Furthermore, the patient must be brought to the equipment. Consequently, such arrangements are not adapted for widespread use or for rapid mass surveys.

The apparatus herein disclosed is relatively inexpensive and is particularly adapted for easy, rapid and, uncomplicated use by busy doctors, nurses and clinical workers.

SUMMARY OF THE INVENTION

Temperature-sensitive probes are plug-connectable to an electronic, digital temperature computer-indicator in such a manner as to automatically provide a measurement of the base temperature of a selected zone of a human body, or the difference in temperature between two selected zones. A print-out mechanism, associated with the temperature computer-indicator, provides a record of the measured and computed temperature values at predetermined time intervals or when predetermined levels of base or differential temperatures are reached or exceeded. A monitoring device provides an alarm upon deviation of the measured temperature value from a predetermined norm.

An object of this invention is the provision of an improved diagnostic aid in the detection of diseases which exhibit temperature variations or gradations between zones of a human body.

An object of this invention is the provision of a simple, rapid and direct reading arrangement for accurately determining the base temperature of a selected zone of a human body and the computed differential temperature between selected, opposite or adjacent zones of the body.

An object of this invention is the provision of an arrangement for measuring the temperature of selected zones of a human body, which arrangement comprises temperature-sensitive probes adapted for contact with selected body zones and an electronic, digital temperature computation and indication device responsive to the temperature of the probes.

An object of this invention is the provision of an arrangement for determining the possible presence of disease located in selected zones of a human body having a higher than or lower than normal temperature, which arrangement comprises temperature-sensitive probes adapted for contact with the selected body zones and plug-connectable to an electronic, digital temperature computer-indicator, means for recording the temperature values indicated by said temperature computer-indicator and means providing an alarm when the indicated temperature value deviates from a predetermined norm.

The above and other objects and advantages of the invention will become apparent from the following description when taken with the accompanying drawing, it being understood that the drawings are for purposes of illustration and are not to be construed as defining the scope or limits of the invention.

BRIEF DESCRIPTION OF THE DRAWING

In the drawings wherein like reference characters denote like parts in the several views:

FIG. 1 is a diagrammatic representation of apparatus for measuring and computing the temperature of selected zones of a human body in accordance with this invention;

FIG. 2 is a circuit diagram of the bridge circuit;

FIG. 3 shows a standardizing resistor for balancing the bridge circuit at a predetermined temperature;

FIG. 4 is a diagrammatic representation showing a temperature-sensitive probe provided with a visual alarm;

FIG 5 is a diagrammatic representation showing a temperature-sensitive probe provided with an audible alarm;

FIG. 6 is a chart showing representative temperature measurements made in the four quadrants of the left and right breasts; and FIG. 7 is a diagrammatic representation showing an arrangement for scanning a plurality of temperature-sensitive probes attached to the four quadrants of the breasts.

DESCRIPTION OF THE PREFERRED EMBODIMENT

Referring to FIG. 1, there is shown a conventional digital temperature computer-indicator 10 provided with sockets 11 and 12 for receiving conventional plug connectors, said sockets being identified by (+) and (−) legends carried by the panel. A first probe 13 comprises a temperature-sensitive element such as, for example, a thermistor, encased within a small, flat disc 14 made of material having good thermal conductivity. The thermistor is connected to flexible leads 15, which leads pass through a handle portion 16 and are connected to a conventional plug-connector 17 carrying the identifying marking (−). A similar probe 18 is connected to the plug 19 carrying the identifying marking (+). The temperature indicator 10 provides an indication of the base temperature of a single probe or the computed difference temperature between the two probes.

Referring to FIG. 2 there is shown a conventional Wheatstone bridge 21 forming the temperature-responsive component of the digital temperature computer-indicator. The three bridge resistors 22–24 are made of wire or other material having a zero temperature coefficient of resistance. The thermistors carried by the probes 13 and 18 have matched temperature coefficients of resistance and the ohmic values thereof are selected to balance the bridge at a selected temperature. When the plug-connector 19 is inserted into its socket 11, the thermistor carried by the probe 18 forms the fourth arm of the bridge. At the same time, the end of the plug-connector closes a normally open switch 25 thereby applying an energizing voltage to the power supply 26 from a 110 volt, AC source 27. The power supply furnishes appropriate output voltages for operation of the digital temperature indicator and, also, a DC voltage across the input junctions 28 and 29 of the bridge 21. The magnitude of the output voltage of the bridge, appearing across the bridge output junctions 30 and 31, varies with the resistance of the thermistor in the probe 18 and such voltage is converted into a digital temperature presentation. As illustrated in FIG. 1, and assuming the plug connector 19 is inserted into the socket 11, the temperature of the sensing probe 18 is 98.6° F. When the connector plug 19 is withdrawn from the socket 11, the voltages are removed from the digital temperature computer-indicator, whereby the apparatus is dormant during periods when it is not in use.

The resistor 24 is connected in the bridge circuit through the normally closed switch 33. When the connector plug 17 is inserted into its' socket 12, the switch 33 is opened and the thermistor of the (−) probe 13 replaces the resistor 24 as an arm of the bridge. Since the thermistors of the two probes are matched in basic ohmic value and temperature coefficient of resistance, the magnitude of the bridge output voltage will now vary in correspondence with the difference in temperature between the two thermistors.

Referring back to FIG. 1, the insertion of the connector plug 19 into the socket 11 results in the energization of the digital temperature computer-indicator 10 and the latter presents a visual display of the temperature of the body zone engaged by the sensing probe 18. If, now, the connector plug 17 also is inserted into its' socket 12, the computer-indicator 10 presents a visual display of the temperature difference between two body zones engaged by the two probes. By placing the two probes in contact with corresponding, opposite zones of the body such as, for example, the forehead, breasts, etc., or simultaneously moving both probes along opposite sides of the spine, a difference temperature indication exceeding a predetermined magnitude is immediately indicative of zones of possible trouble and requiring further investigation.

The temperature indications of the digital temperature computer-indicator 10 may be recorded on the chart 34 of a conventional printout device 35 placed into operation upon closure of the line switch 36. To record any temperature being indicated, the operator closes the switch 37. The printout device may be provided with means for printing the time of day on the chart as indicated by the markings 39. A visual and/or audible alarm 40 is connectable to the digital temperature computer-indicator by means of a 3-position switch 41. The temperature at which the alarm is actuated is presetable by manually positioning the dial 42, of an alarm preset 43, with respect to a scale 44 calibrated in temperature difference values. Specifically the operator aligns the dial 42 with a desired scale mark say, 5, closes the switch 45 and sets the 3-position to the right stationary contact. The operator now can devote full attention to the placement of the sensing probes into contact with selected zones of the body and the alarm will be actuated only when the temperature difference between such zones equals or exceeds 5° F. The temperature recording arrangement and the alarm arrangement can be used either separately or together in conjunction with the digital temperature computer-indicator.

Reference now is made to FIG. 3, wherein there is shown a standard resistor comprising a resistor 46 contained within a housing 47 secured to a connector plug 48, which plug is the same as the connector plug 19 shown in FIGS. 1 and 2. The resistor 46, as well as the leads which connect the resistor to the contact terminals of the connector plug, are made of a material having a zero temperature coefficient of resistance. The ohmic value of this resistor is equal to that of the thermistor of the probe 18 (FIG. 1) at 90° F. and the housing 47 is so marked. A plurality of similar standard resistors are provided, each adjusted to represent a specific temperature falling within the temperature range of the human body. Any one of such standard resistors can be plugged into the socket 11 of the digital temperature computer-indicator and the indicated temperature will correspond to that marked on the particular standard resistor. This provides a quick check to assure the operator the apparatus is in proper working order. Equally important, the single sensing probe 18, FIG. 1, can be used to measure the temperature of a selected body area of a particular patient, which area includes a zone of particular interest. Assuming the selected zone has a normal, or base, temperature of 90° F., the operator can plug-connect the standard resistor marked 90° F. to the digital temperature indicator in place of the probe 18. He now can plug-in the other connector plug 17 and explore the corresponding, opposite zone of the patient's body with the sensing probe 13. In this case, the temperature difference between the two body zones is measured although only a single probe is placed into engagement with the zone under investigation, the standard plug acting as a simulator of the temperature of the zone first selected.

FIG. 4 illustrates an arrangement wherein an alarm is provided proximate to the sensing probe. Here, the probe 13 and the connector plug 17 are connected together through a tubular housing 50 which also serves as a handle. A lamp 51, visible through one or more openings formed in the housing 50 is connected to a pulse generator 53. Closure of the 3-position switch 41 to the left, as shown in FIG. 4, connects the pulse generator to the digital temperature computer-indicator. Under this condition, when the alarm preset switch 45 (FIG. 1) is closed, the pulse generator will be actuated when the temperature difference between the body zones under investigation equals or exceeds the temperature setting of the alarm preset 43. Actuation of the pulse generator causes the lamp 51 to flash.

An arrangement wherein an audible alarm varies in frequency in correspondence with the temperature difference between two body zones explored by the two sensing probes is shown in FIG. 5. Here, an oscillator 55 is energized upon closure of the line switch 56, said oscillator driving a suitable electromechanical transducer carried by the tubular housing 57 provided with apertures 58. Upon closure of the switch 59, the oscillator is connected to the digital temperature computer-indicator. Included within the circuit of the oscillator are conventional means for varying the oscillator frequency in correspondence with the magnitude of the voltage supplied by the digital temperature computer-indicator. Hence, the frequency of the audible tone emanating from the tubular member 57 will vary in correspondence with the difference in temperature between the two body zones under investigation.

FIG. 6 shows two charts representative of the left and right breast, each chart being divided into four quadrants which for purposes of description are identified as the top, bottom, left and right quadrants by the reference characters T, B, L and R, respectively. Also shown in FIG. 6 are temperature values as may be obtained in the four quadrants, or zones, by means of the apparatus herein described. It will be noted that the maximum temperature difference between corresponding, opposite zones, namely, the L quadrant of the left breast and the R quadrant of the right breast, is 3.4° F. Such temperature difference is indicative of the existence of a condition requiring further attention.

Temperature measurements of the type represented in FIG. 6 can be obtained by using sensing probe 18 as shown in FIG. 1. An arrangement for monitoring such temperature measurements is shown in FIG 7. Four sensing probes 61–65 are connected to a scanner 66 by flexible leads, which scanner is connectable to the digital temperature indicator by means of the two connector plugs 67 and 68. The sensing probes can be attached to the left breast, one in each quadrant, by adhesive tape. Similarly, the sensing probes 69–72 are attached to the right breast. The scanner sequentially connects the appropriate probes to the connector plugs and includes indicia identifying the particular pair of probes which are connected to the digital temperature indicator at the particular moment. As shown in FIG. 7, the scanner indicia indicates that the probe 62 (left quadrant of the left breast) and the probe 70 (right quadrant of the right breast) are connected to the digital temperature indicator. Preferably, the probes carry identifying markings to facilitate the proper attachment thereof to the particular body zones to be surveyed. Although only four probes are shown in FIG. 7, it will be apparent that a greater number of probes may be provided for each breast, thereby to provide for the measurement of body zones spaced apart by less than 90°. Also, the printout arrangement and/or the alarm arrangement shown in FIG. 1 can be used in conjunction with the monitoring arrangement shown in FIG. 7.

Having now described the invention what I desire to protect by Letters Patent is set forth in the following claims.

I claim:

1. Apparatus for use in the detection of disease in one or the other of two related zones of a human body, which apparatus comprises, a. a pair of temperature-sensitive elements connected to individual connector plugs and adapted for engagement with the body zones, b. a bridge circuit having first and second connector sockets, each socket being connected to adjacent bridge junctions, c. a digital temperature computer-indicator means responsive to the output voltage of the bridge circuit, d. means automatically effective upon the insertion of one of the connector plugs into one of the connector sockets to cause said indicator to indicate the temperature of the associated temperature-sensitive element, and e. means automatically effective upon the insertion of the other connector plug into the other connector socket to cause said indicator to indicate the difference in temperature between the two temperature-sensitive elements.

2. Apparatus for the direct measurement of the temperature of selected zones of a human body, which apparatus comprises, a. a resistance bridge comprising a pair of fixed resistors forming two bridge arms and a third resistor forming a third bridge arm, said third resistor being connected to adjacent bridge junctions through a normally closed switch, b. a first connector socket connected across adjacent bridge junctions which normally define the fourth bridge arm, c. a second connector socket connected across the said third resistor and normally closed switch, d. means applying a voltage to the input junctions of the bridge, e. a digital temperature computer-indicator means responsive to the output voltage of the bridge, f. a first temperature-sensitive probe means connected to a first connector plug and adapted for engagement with a zone of the body, said probe means constituting the fourth bridge arm when the connector plug is inserted into said first connector socket, and g. a second temperature sensitive probe means connected to a second connector plug and adapted for engagement with a zone of the body, said connector plug opening said normally closed switch and connecting the probe means to the said second connector socket when the connector plug is inserted into the said connector socket.

3. The invention as recited in claim 2, wherein the means applying a voltage to the input junctions of the bridge includes a normally open switch proximate to said first connector socket, said normally open switch being closed by the first connector plug when it is inserted into the first connector socket.

4. The invention as recited in claim 2, including printout means controlled by the digital temperature computer-indicator means, said printout means providing a record of the temperature values indicated by the digital temperature indicator.

5. The invention as recited in claim 2, including an alarm and means actuating the alarm when the temperature as indicated means by the digital temperature computer-indicator is a predetermined value.

6. The invention as recited in claim 5, including adjustable means for presetting the temperature at which the alarm is actuated.

7. The invention as recited in claim 5, wherein the said second probe means includes a handle portion carrying the said alarm.

8. The invention as recited in claim 2, including a first set of temperature-sensitive probe means attachable to selected zones of the body, said first temperature-sensitive probe means being included in the said first set of probe means; a second set of temperature-sensitive probe means attachable to selected zones of the body, said second temperature-sensitive probe means being included in the said second set of probe means; and scanning means sequentially connecting single probe means of the said first and said second set of probe means to the said first and the said second connector plugs, respectively; and wherein all of the probe means are matched in basic ohmic value and temperature coefficient of resistance.

* * * * *